(12) United States Patent
Iida

(10) Patent No.: US 8,498,002 B2
(45) Date of Patent: Jul. 30, 2013

(54) INFORMATION PROCESSING APPARATUS CAPABLE OF CUSTOMIZING DEVICE DRIVER, INFORMATION PROCESSING METHOD, AND CONTROL PROGRAM

(75) Inventor: Mitsunori Iida, Katsushika-ku (JP)

(73) Assignee: Canon Kabushiki Kaisha, Tokyo (JP)

(*) Notice: Subject to any disclaimer, the term of this patent is extended or adjusted under 35 U.S.C. 154(b) by 777 days.

(21) Appl. No.: 11/377,117

(22) Filed: Mar. 16, 2006

(65) Prior Publication Data
US 2006/0221370 A1   Oct. 5, 2006

(30) Foreign Application Priority Data
Mar. 29, 2005   (JP) .................................. 2005-095694

(51) Int. Cl.
*G06F 3/12* (2006.01)

(52) U.S. Cl.
USPC ......... 358/1.15; 358/1.13; 715/700; 715/733; 715/747; 715/762

(58) Field of Classification Search
USPC .................. 358/1.1–1.16; 715/700, 633, 747, 715/652
See application file for complete search history.

(56) References Cited

U.S. PATENT DOCUMENTS

| | | | |
|---|---|---|---|
| 5,291,585 A | 3/1994 | Sato et al. | |
| 6,814,510 B1* | 11/2004 | Sabbagh et al. | 400/63 |
| 6,825,941 B1* | 11/2004 | Nguyen et al. | 358/1.15 |
| 7,366,980 B2 | 4/2008 | Small | |
| 7,869,068 B2* | 1/2011 | Foehr et al. | 358/1.15 |
| 2003/0043396 A1* | 3/2003 | Klosterman et al. | 358/1.13 |
| 2004/0070640 A1* | 4/2004 | Ferlitsch | 347/19 |
| 2004/0223182 A1* | 11/2004 | Minagawa | 358/1.15 |
| 2005/0039193 A1* | 2/2005 | Choi et al. | 719/321 |
| 2005/0190392 A1* | 9/2005 | Carroll | 358/1.13 |

FOREIGN PATENT DOCUMENTS

| | | |
|---|---|---|
| GB | 2357600 | 6/2001 |
| KR | 2004-048938 A | 6/2004 |
| WO | 96/04603 | 2/1996 |
| WO | 03-032152 A1 | 4/2003 |

* cited by examiner

*Primary Examiner* — Benny Q Tieu
*Assistant Examiner* — Michael Y Tzeng
(74) *Attorney, Agent, or Firm* — Canon USA, Inc., IP Division

(57) ABSTRACT

An information processing apparatus includes a processing unit and associated operating system (OS). The information processing apparatus further includes an application program including a driver customization unit to customize a device driver in the absence of registration of the device driver in an operable manner to the operating system. Even when a printer driver for use on a particular OS is not customizable, it is possible to produce a customized driver corresponding to the printer driver in a manner specified by a user, thereby allowing customization to be performed in a highly efficient manner.

15 Claims, 11 Drawing Sheets

FIG. 7A

```
INF FILE FOR 98/Me
...
[Version]
Signature="$CHICAGO$"     ← 730
Class=Printer
Provider=%CANON%
DriverVer=11/27/2004, 10.60.0.7
...
```
— 700

FIG. 7B

```
INF FILE FOR NT4.0
...
[Version]
Signature="$Windows NT$"     ← 740
Provider=%CANON%
LayoutFile=cnl40jnt.inf
ClassGUID={4D36E979-E325-11CE-BFC1-08002BE10318}
Class=Printer
DriverVer=11/27/2004, 10.60.0.7
...
[Strings]
CANON="Canon"
CLASSNAME="Printer"
NS_LMON_CPCA="CPCA Language Monitor2, AUCPLMNT.DLL"
DISK1="LIPS4 Printer Driver for Microsoft Windows NT Version 4.0    ← 760
Version 10.60 Installer Disk"
```
— 710

FIG. 7C

```
INF FILE FOR 2000/XP/SERVER 2003
...
[Version]
Signature="$Windows NT$"     ← 750
Provider=%CANON%
ClassGUID={4D36E979-E325-11CE-BFC1-08002BE10318}
Class=Printer
DriverVer=11/27/2004, 10.60.0.7
CatalogFile.NTx86=CNL40J.CAT
...
[Strings]
CANON="Canon"
NS_LMON_CPCA="CPCA Language Monitor2, AUCPLMNT.DLL"
DISK1="LIPS4 Printer Driver for Microsoft Windows 2000/XP/    ← 770
Server 2003 Version 10.60 Installer Disk"
```
— 720

| API | QUASI-API NAME |
|---|---|
| GetVersionEx | CSPL_GetVersionEx |
| OpenPrinter | CSPL_OpenPrinter |
| ClosePrinter | CSPL_ClosePrinter |
| SetPrinter | CSPL_SetPrinter |
| GetPrinter | CSPL_GetPrinter |
| GetPrinterDriver | CSPL_GetPrinterDriver |
| SetPrinterData | CSPL_SetPrinterData |
| GetPrinterData | CSPL_GetPrinterData |

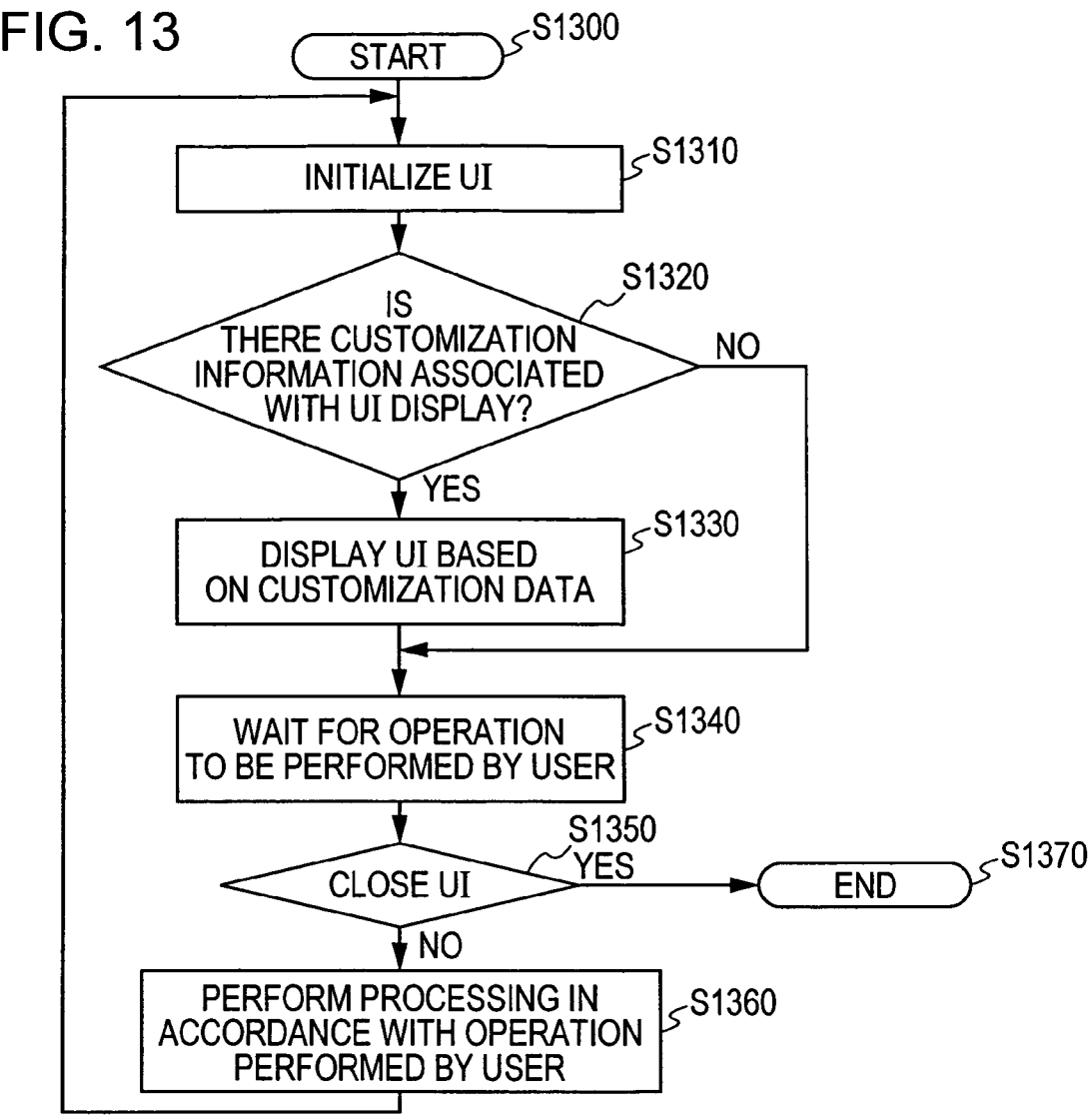

INFORMATION PROCESSING APPARATUS CAPABLE OF CUSTOMIZING DEVICE DRIVER, INFORMATION PROCESSING METHOD, AND CONTROL PROGRAM

BACKGROUND OF THE INVENTION

1. Field of the Invention

The present invention relates to an information processing apparatus in which a device driver and a related program are installed, a method of controlling such an information processing apparatus, and a medium in which a control program is stored.

2. Description of the Related Art

In a known system including a customizable printer driver, when an install set for installation of a customized printer driver is produced, it is first necessary to install a printer driver to be customized in an OS (Operating System), and then start a procedure to produce the install set for installing the customized printer driver in the OS.

Therefore, in a network environment including a plurality of types of OSs on information processing apparatus (for example client PCs), when a network administrator produces a customized driver for each client PC, it is necessary to produce customized drivers one by one in units of OS type in the above-described procedure. This is not efficient when it is necessary to produce customized drivers for a large number of different types of OSs. The process of producing customized drivers thus imposes a large workload on a production operator.

In the conventional customization technique, although it is possible to control an item in a user interface (UI) so that the item is disabled, it is impossible to hide any item from a user interface. This makes it difficult for a user of a customized printer driver to determine whether a particular item is disabled as a result of customization, or as a result of a conflict with some exclusive setting in a printing operation, and thus it is difficult for the user to perform a customizing operation.

SUMMARY OF THE INVENTION

In view of the above, the present invention provides a technique of producing an install set for a customized driver without installing a printer driver thereby providing an improvement in operation efficiency.

Even when a printer driver for use on a particular OS is not customizable, it is possible to produce a customized driver corresponding to the printer driver in a manner specified by a user, thereby allowing customization to be performed in a highly efficient manner.

More specifically, the present invention provides an information processing apparatus including acquisition means for acquiring one or more properties including a property associated with printing, and setting means for setting, in a device driver, the one or more properties including the property associated with the printing acquired by the acquisition means without having to register the device driver in an operable manner in an operating system.

The invention also provides an information processing apparatus capable of customizing a device driver that controls a printer, by setting a property of the device driver, the information processing apparatus comprising determination means for determining whether the device driver is customizable, setting means for, if the determination means determines that the device driver is customizable, setting a document property and a device property by displaying, on display means, a setting screen for setting the document property and the device property, acquisition means for acquiring data corresponding to the set property of the device driver, and display control means for displaying the data acquired by the acquisition means in a user interface based on the document property and the device property set by the setting means.

Other features and advantageous of the present invention will be apparent from the following description taken in conjunction with the accompanying drawings, in which like reference characters designate the same or similar parts throughout.

BRIEF DESCRIPTION OF THE DRAWINGS

FIGS. 7A to 7C show examples of contents of "inf" files in which install information associated with a printer driver is described.

FIG. 13 is a flow chart showing a process of controlling a user interface for setting a property of a printer driver for customization.

FIG. 14 is a diagram showing an example of customization data associated with a device driver.

DESCRIPTION OF THE EMBODIMENTS

The present invention is described in further detail below with reference to embodiments in conjunction with the accompanying drawings. Note that it is assumed in the following embodiments, by way of example, that a printer driver of Microsoft Windows (registered trademark), which is an OS (Operating System) for a PC (Personal Computer), is customized.

First Embodiment

Figure 1:
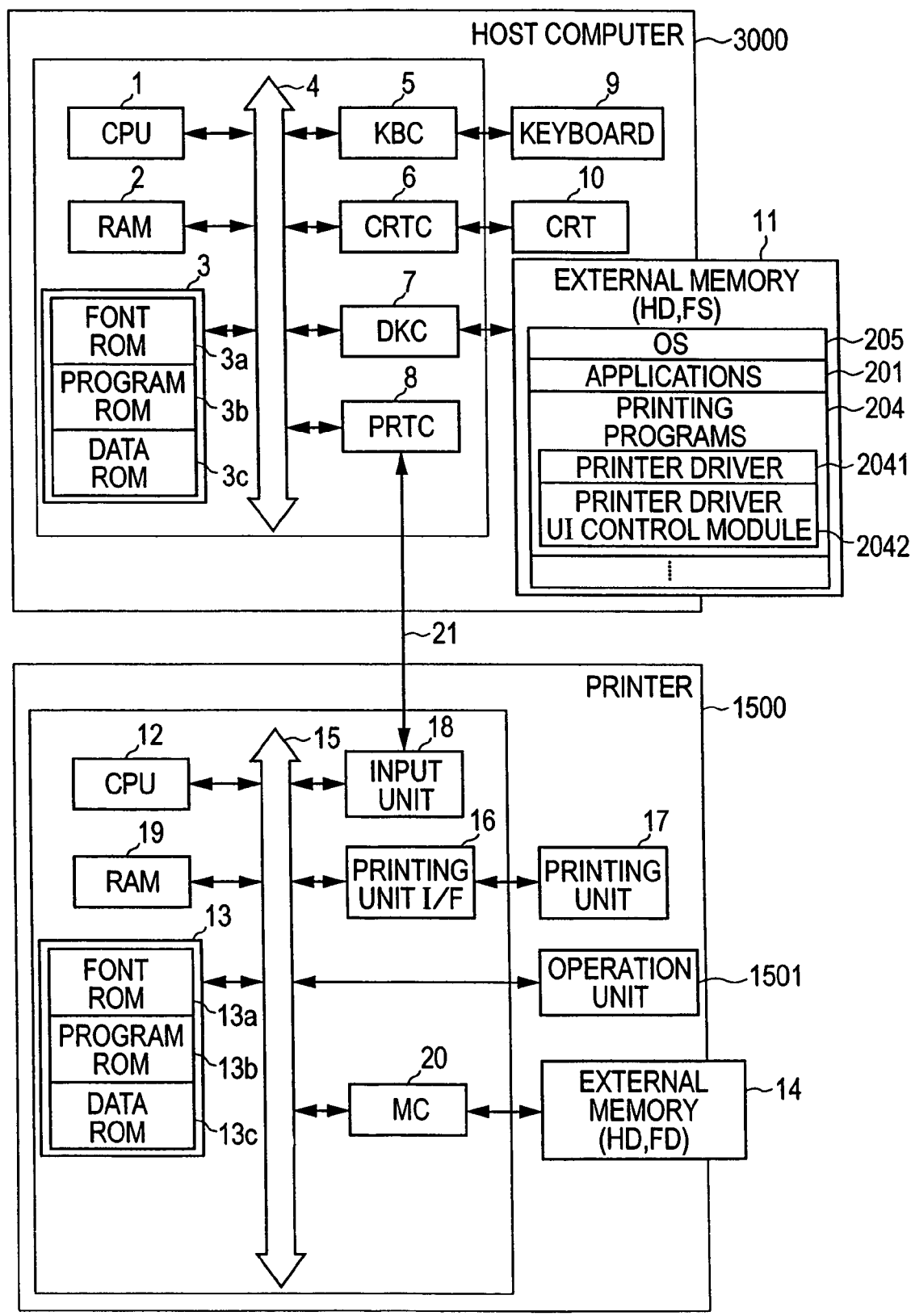
FIG. 1 is a block diagram showing a print processing system according to an embodiment of the present invention.

FIG. 1 is a block diagram showing a print processing system according to a first embodiment of the present invention. This print processing system includes an information processing apparatus (hereinafter also referred to as a host computer) 3000, and a printer 1500 adapted to receive print data from the host computer 3000 and perform printing in accordance with the received print data.

In the host computer 3000, a CPU 1 centrally controls various devices connected to a system bus 4 in accordance with a program stored in a RAM 2. The RAM 2 also functions as a main memory or a work area used by the CPU 1. A ROM 3 stores various programs and data, and the ROM 3 includes various storage areas for storing respective programs or data. More specifically, the ROM 3 includes a font ROM 3a for storing various font data, a program ROM 3b for storing a boot program or BIOS, and a data ROM 3c for storing various data.

A keyboard controller (KBC) 5 controls inputting of a command or data via a keyboard (KB) 9 or a pointing device (a mouse) (not shown). A CRT controller (CRTC) 6 controls a displaying operation of a CRT display (CRT) 10. A Disk controller (DKC) 7 controls accessing to an external memory 11 such as a hard disk. A printer controller (PRTC) 8 is connected to a printer 1500 via a bidirectional interface 21, and controls communication between the host computer 3000 and the printer 1500.

As for the external memory 11, a hard disk (HD), magneto-optic (MO), or a floppy (registered trademark) disk (FD) may be used. As shown in FIG. 1, the external memory 11 stores an operating system program (hereinafter, referred to as an OS) 205, various kinds of applications (such as a document processing application program for processing a document including a mixture of graphics data, image data, text data, table data, etc.) 201, and a program associated with printing (hereinafter, referred to as a printing program) 204. The external memory 11 is also used to store a user file, an edit file, etc. The printing program 204 is a program for generating printing data described using a page description language and can be used in common for a plurality of similar-type printers. The printing program 204 includes a printer control command generation module (hereinafter, referred to as a printer driver) 2041, and a printer driver user interface control module 2042.

Applications 201 including a customization tool program (hereinafter, referred to simply as a customization tool) according to the present embodiment are loaded from the external memory 11 into the RAM 2 and executed by the CPU 1. The CPU 1 also converts (rasterizes) print data into outline font data and stores the resultant data in the RAM 2 so that the resultant data can be displayed on the CRT 10 in a WYSIWYG (What You See Is What You Get) manner. If a command is issued by clicking a particular point on the CRT 10 with a mouse cursor (not shown), the CPU 1 opens a corresponding window and performs data processing according to the command. For example, when a printing operation is performed, a user opens a print setting screen (controlled by the printer driver user interface control module 2042) and sets the printer driver 2041 in terms of printing conditions including a print mode for the printing operation.

Now, the structure of the printer 1500 is described. A CPU 12 generally controls the operation of the printer 1500. The RAM 19 functions not only as the main memory and the work area used by the CPU 12 by also as an area in which information is stored in an output form and as an area in which environmental data is stored. The RAM 19 also includes a NVRAM (Non-Volatile RAM) area, and is designed to be extensible in memory capacity by connecting an optional RAM to an extension port (not shown). The ROM 13 includes a font ROM 13a for storing various font data, a program ROM 13b for storing a control program executed by the CPU 12, and a data ROM 13c for storing various kinds of data. An input unit 18 transmits and receives data to or from the host computer 3000. A printing unit interface (I/F) 16 serves as an interface with a printer unit 17.

Accessing to an external memory 14 is controlled by a memory controller (MC) 20. As for the external memory 14, for example, a hard disk (HD), a MO, a floppy (registered trademark) disk (FD), or an IC card may be used. The external memory 14 is used to store font data, an emulation program, form data, etc. In a case in which no external memory 14 such as a hard disk is connected, information used by the host computer 3000 is stored in the data ROM 13c of the ROM 13. There is no particular restriction on the number of external memories 14. For example, an optional font card for providing optional font data in addition to the built-in font data or an external memory in which to store a program for interpreting an additional printer control language may also be connected.

An operation unit 1501 has an operation panel via which a user inputs a command or data. The operation panel includes switches by which to input a command and LED indicators (not shown). The operation panel may further include a NVRAM (Non-Volatile RAM) (not shown) for storing printer mode setting information input via the operation panel.

In accordance with the control program stored in the program ROM 13b of the ROM 13, the CPU 12 outputs an image signal as output information to the printing unit (printer engine) 17 via the printing unit interface 16. The CPU 12 is capable of communicating with the host computer 3000 via the input unit 18. More specifically, the CPU 12 is capable of receiving print data transmitted from the host computer 3000 and transmitting information indicating the status of the printer 1500 to the host computer 3000.

Figure 2:
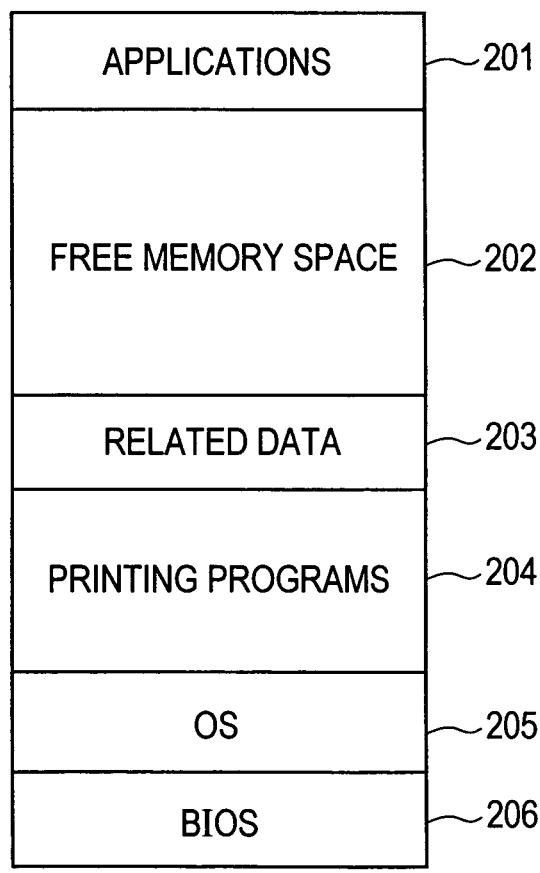
FIG. 2 is a diagram showing a memory map of a RAM of a host computer in a state in which an application program and a printing program are activated and the program and associated data are stored in the RAM.

FIG. 2 is a diagram showing a memory map of the RAM 2 of a host computer 3000 in a state in which an application program and a printing program are activated and the program and associated data are stored in the RAM 2.

As shown in FIG. 2, in the RAM 2, a BIOS 206, an OS 205, an application 201, a printing program 204, and related data 203 are loaded so that the application 201 and the printing program 204 are executable. The RAM 2 also has a free memory area 202. The printer driver user interface control module 2042 (FIG. 1) included in the printing program 204 displays a print setting screen on the CRT 10 in response to a print setting command issued by a user so that the user is allowed to perform setting using the keyboard 9 or the like.

Figure 3:
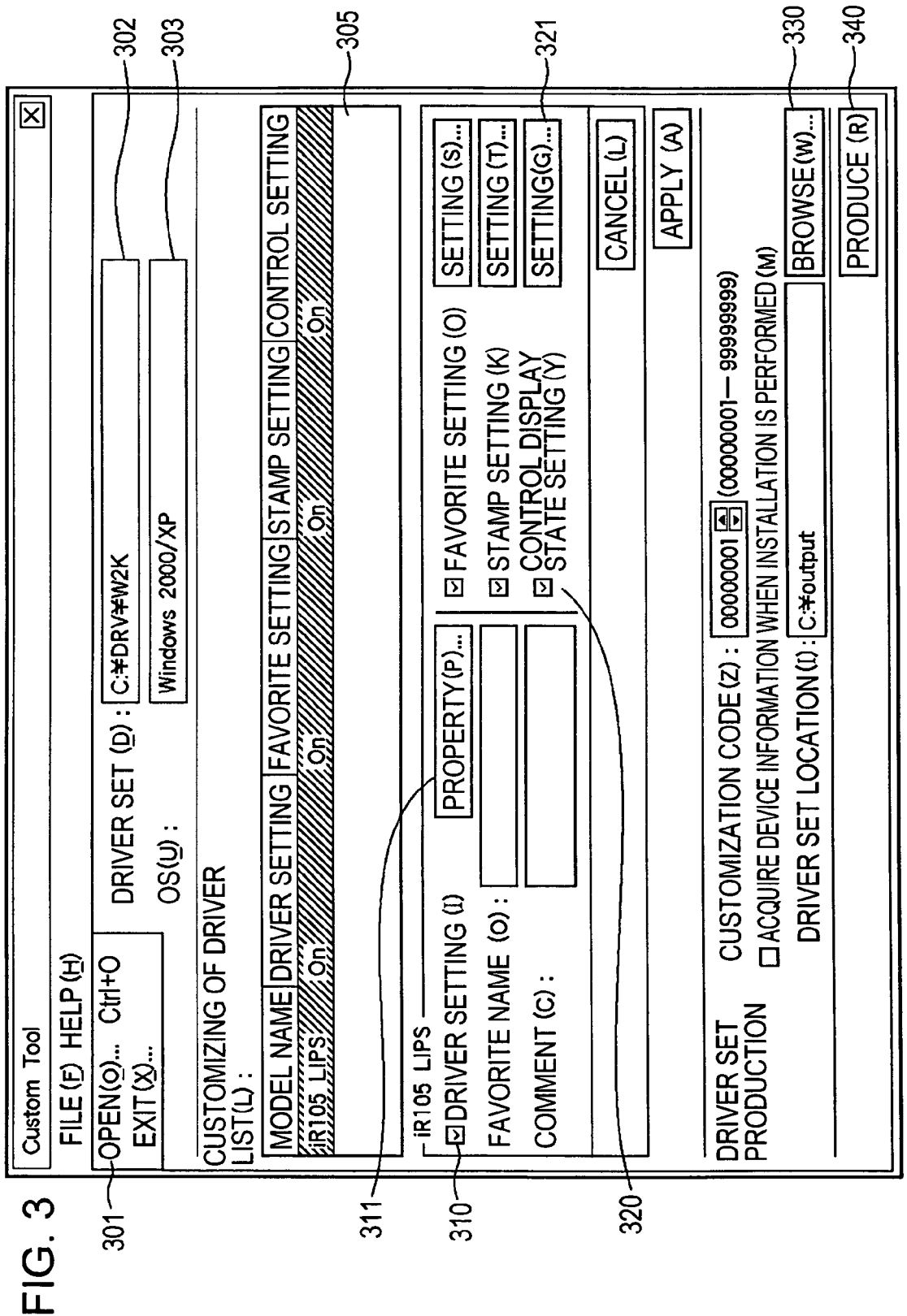
FIG. 3 is a diagram illustrating an example of a user interface of a customization tool.

FIG. 3 is a diagram illustrating an example of a user interface of a customization tool. The customization tool runs on Windows (registered trademark) 2000/XP/Server 2003, and is capable of customizing a printer driver designed to operate on Windows (registered trademark) 98/ME, Windows (registered trademark) NT 4.0, or Windows (registered trademark) 2000/XP/Server 2003. Note that the present invention is not limited to these operating systems. The present invention may also be applied to other operating systems. In the case that a printer driver is not installed, an operation of an API of a specific OS is accomplished virtually by a simulative operation performed by pseudo API (described in detail later). The pseudo API operates differently depending on arguments of individual pseudo API functions.

In the customization tool user interface shown in FIG. 3, if a user selects "OPEN" in a menu 301, a dialog box (not shown) is displayed to allow a user to specify a folder in which to store a customized driver set. The specified folder is displayed in a display field 302, and an OS on which the specified driver set is to be run is displayed in a display field 303.

In a list view 305, the model name of a printer driver to be customized and marks "ON" indicating whether respective items are customized are displayed. For example, if a check box 310 is checked, a button 311 is enabled. In this state, if the button 311 is clicked, a user interface (FIG. 4) for customizing the printer driver is displayed to allow a user to make settings in terms of default values of printing setting (document property), device settings (printer property), etc.

If a check box 320 is checked, a button 321 is enabled. In this state, if the button 321 is pressed, a user interface (FIG. 5) is displayed to allow a user to define how to control displaying of items in the printer driver user interface.

If a button 330 is pressed, a dialog box (not shown) for specifying a folder in which to generate a customized driver is displayed so that a user is allowed to specify a folder in which to generate a customized driver.

After setting is completed, if a button 340 is pressed, a customized printer driver is produced in accordance with the setting.

Figure 4:
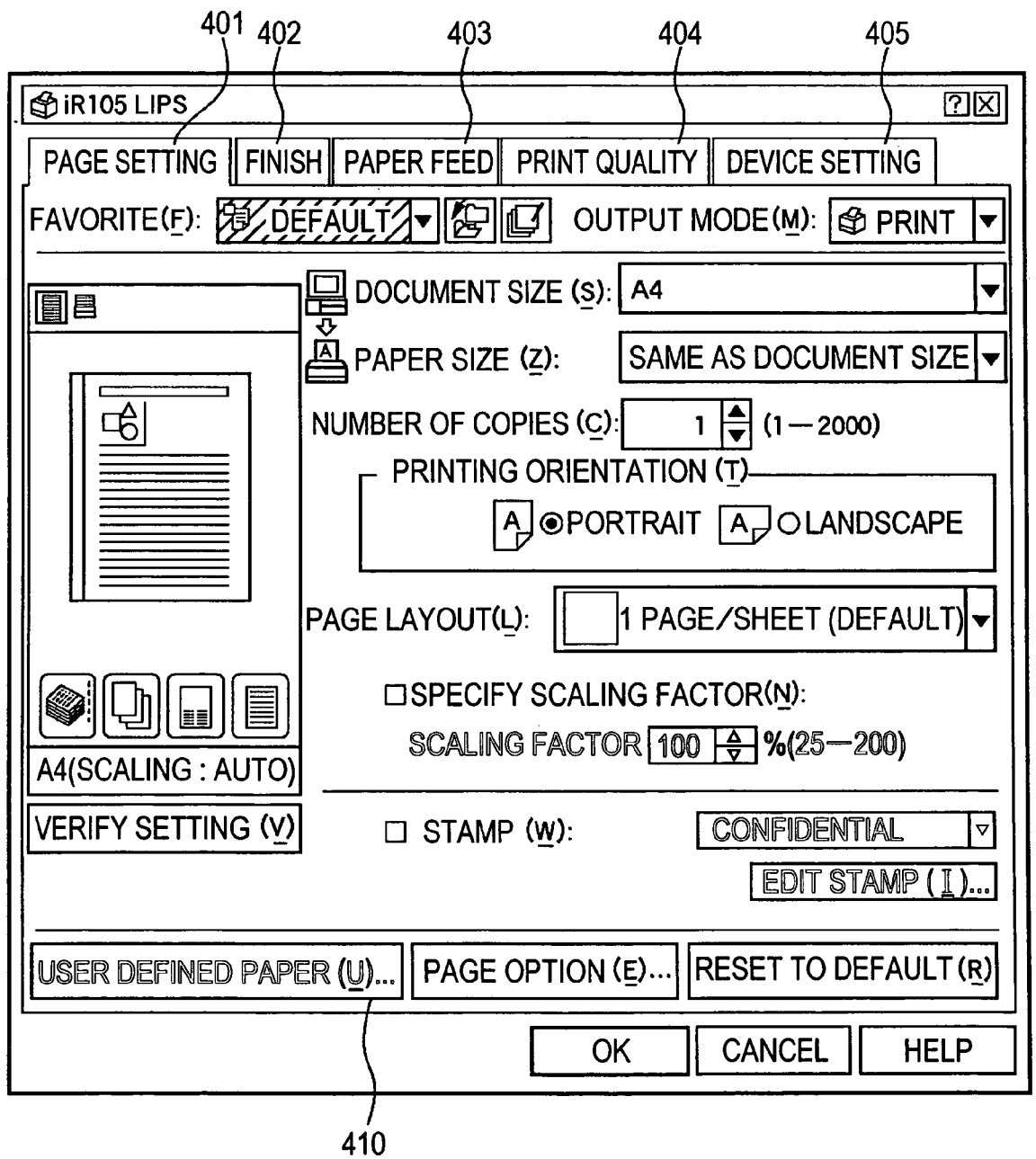
FIG. 4 is a diagram showing an example of a printer driver user interface for specifying default initial settings.

FIG. 4 shows an example of a user interface for customizing default values of a printer driver. This user interface appears when the button 311 in the user interface shown in FIG. 3 is clicked.

Under the control of the CPU 1, the customization tool functions as a setting unit of the information processing apparatus. More specifically, for example, the setting unit displays on a CRT a setting screen, such as the user interface screen shown in FIG. 4, for setting a document property and a device property.

In a conventional user interface for setting a printer driver installed on Windows (registered trademark) NT4.0 or Windows (registered trademark) 2000/XP/Server 2003, a box for setting a document property and a box for setting a device property are displayed on different user interface screens and they cannot be displayed on the same user interface screen. In contrast, in the printer driver customization user interface according to the present embodiment, the customization tool displays the user interface using a printer driver module such that a user interface for setting a document property and a user interface for setting a device property can be displayed on the same user interface screen (as shown in FIG. 4). In the user interface screen shown in FIG. 4, a user is allowed to select a document property user interface from four user interface pages: a "Page Setting" page 401, a "Finish" setting page 402, a "Paper Feed" setting page 403, and a "Print Quality" setting page 404. The user interface screen shown in FIG. 4 also includes a "Device Setting" page 405 for setting a printer property. It is possible to set initial values of document properties and the printer property via these user interface pages (401 to 405).

In the user interface shown in FIG. 4, items that are not allowed to be customized, such as an item denoted by reference numeral 410, are displayed in gray, and selection of such an item is disabled.

Figure 5:
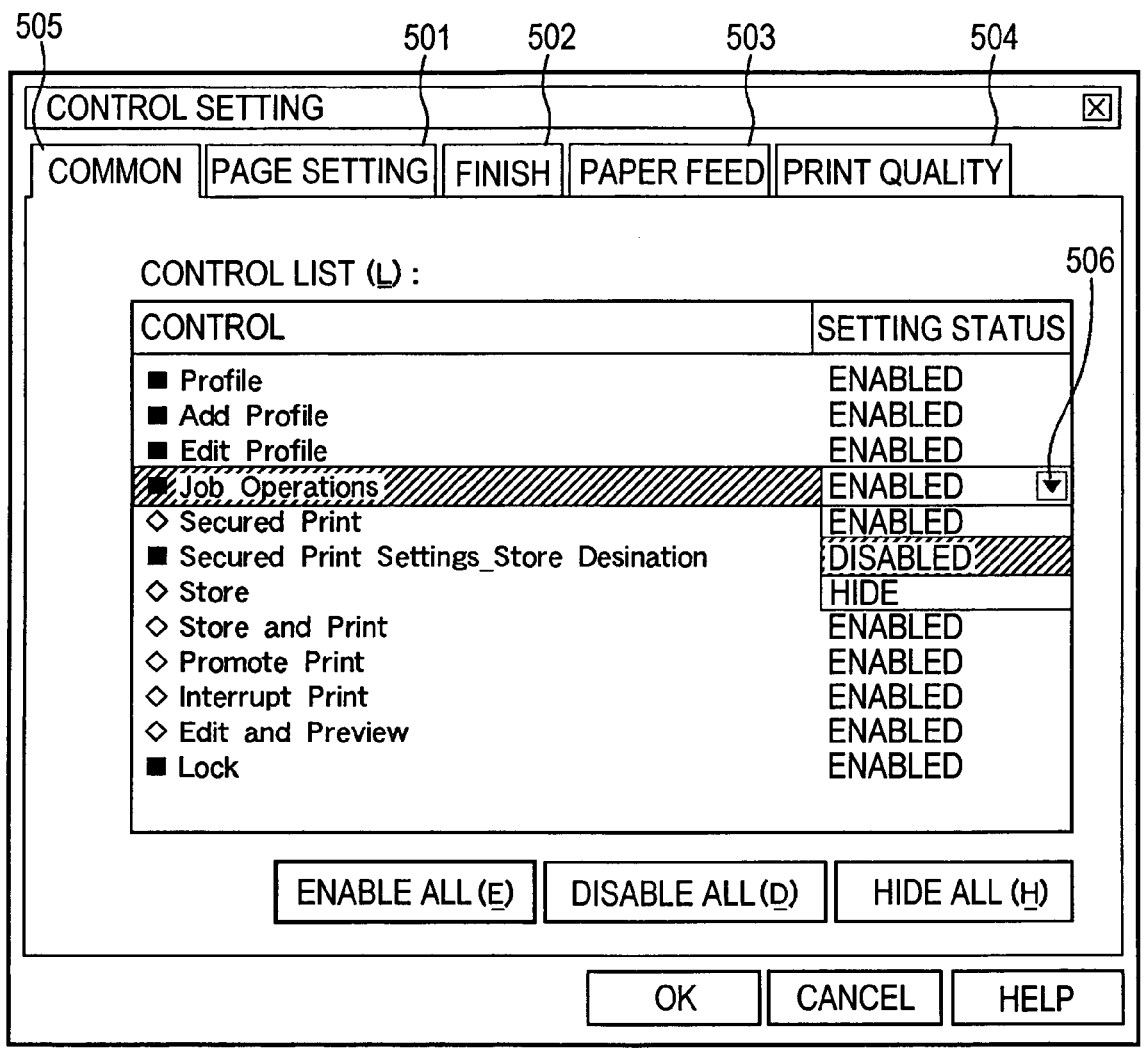
FIG. 5 is a diagram showing an example of a user interface for setting a document property display control.

FIG. 5 is a diagram showing an example of a user interface for setting a document property display control. This user interface is displayed on the CRT 10 of the host computer 3000 when a button 321 shown in FIG. 3 is pressed. In the example shown in FIG. 5, this user interface allows a user to make settings in terms of displaying of various items in a page setting page 501, a finishing setting page 502, a paper feed setting page 503, a print quality setting page 504, and a common setting page 505. More specifically, in the page setting page 501, the finishing setting page 502, the paper feed setting page 503, and the print quality setting page 504, it is allowed to define how to control displaying of items in the document property user interface shown in FIG. 4. In the common setting page 505, it is allowed to make common settings in terms of display control.

A pull-down menu 506 is for setting displaying of a control item "Job Operations" so as to be enabled (in a normal manner), disabled, or void indication. An example of a void indication is a gray-out display of control items. The control items then cannot be operated by users. Other control items can also be set in a similar manner so as to be enabled, disabled, or hidden in the user interface for defining the document property. When the setting step is completed, the customization tool writes information indicating the settings made into a GPD file. A GPD file is substantially the same structure to an UPD file. Printer driver can be customized by modifying UPD file but also GPD file in this embodiment.

Under the control of the CPU 1, the customization tool functions as a display controller of the information processing apparatus. In accordance with the setting of the document property (including control items), the display controller controls the user interface (UI) in terms of enabling, disabling, and hiding of respective items.

Figure 6:
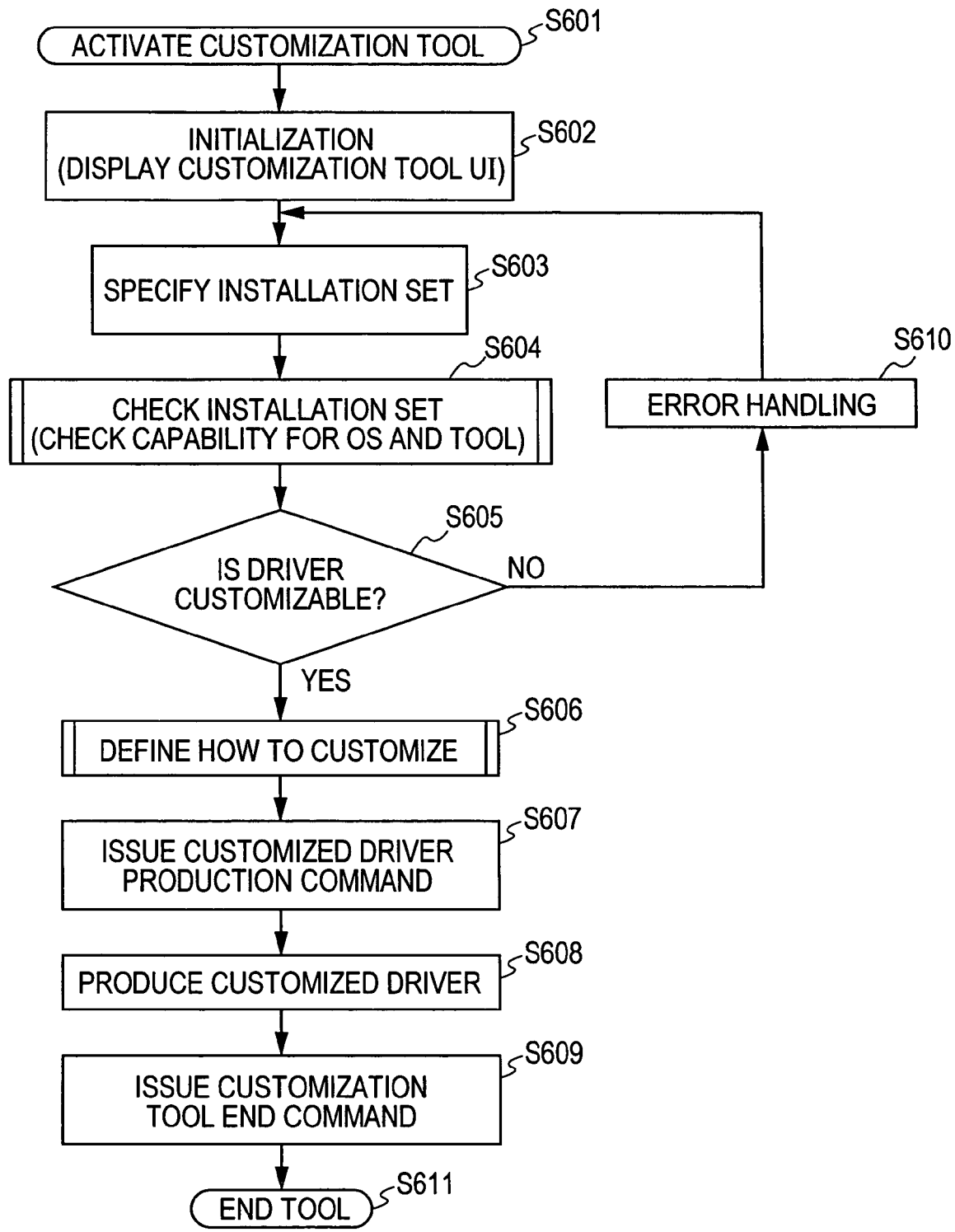
FIG. 6 is a flow chart showing a basic operation of a customization tool.

Now, with reference to the flow chart shown in FIG. 6, the basic operation of the customization tool is described. Note that the basic operation described below is performed mainly by the customization tool running on the CPU 1 of the host computer 3000.

First, in step S601, if a user starts the customization tool, the customization tool is initialized. In step S602, the customization tool displays the user interface screen such as that shown in FIG. 3 on the CRT 10. In step S603, if the user specifies an install set of a printer driver to be customized via the user interface screen shown in FIG. 3, then in step S604, the specified install set is checked. More specifically, in the checking of the specified install set, the customization tool examines the content of a file (700, 710, or 720 in FIGS. 7A to 7C) in which installation information associated with the printer driver is described (hereinafter, such a file will be referred to as an inf file) to determine whether the OS is capable of handling the specified install set and whether the specified printer driver is customizable by the customization tool.

FIGS. 7A to 7C show examples of contents of inf files in which printer driver installation information is described. Note that it is assumed that each inf file includes module information (not shown), and the customization tool identifies, based on the module information, a module that performs a user interface process for the printer driver. In FIG. 7A, reference numeral 700 denotes a part of an inf file for use by Windows (registered trademark) 98/ME. In FIG. 7B, reference numeral 710 denotes a part of an inf file for use by Windows (registered trademark) NT4.0. In FIG. 7C, reference numeral 720 denotes a part of an inf file for use by Windows (registered trademark) 2000/XP/Server 2003. The customization tool running on the CPU 1 examines the setting of "Signature" 730 in the inf file 700 and, if "Signature" is set as a string resource "$CHICAGO$", the customization tool determines that the printer driver can be handled by Windows (registered trademark) 98/ME.

On the other hand, when "Signature" (740 or 750) in the inf file (710 or 720) is set as a string resource "$Windows NT$", the customization tool determines that the printer driver is for use with Windows (registered trademark) NT 4.0 or Windows (registered trademark) 2000/XP/Server 2003. The customization tool further examines whether the string resource "DISK1" (760 or 770) in the inf file (710 or 720) includes "NT". If so, the customization tool determines that the printer driver is for use with Windows (registered trademark) NT 4.0, but if the string resource "DISK1" (760 or 770) in the inf file (710 or 720) does not include "NT", the customization tool determines that the printer driver is for use with Windows (registered trademark) 2000/XP/Server 2003.

When the printer driver is customizable, the inf file associated with the printer driver includes a string resource indicating that the printer driver is customizable. Thus, the customization tool determines whether the printer driver is customizable or not by examining whether the inf file of the printer driver includes the string resource indicating that the printer driver is customizable.

Referring again to FIG. 6, if the determination in step S605 by the customization tool is that the printer driver is not customizable (that is, if the answer to step S605 is No), the process proceeds to step S610 to perform error handling. After the error handling, the process returns to step S603 to again specify an install set.

On the other hand, if the determination in step S605 by the customization tool is that the printer driver is customizable (that is, if the answer to step S605 is Yes), the process proceeds to step S606, in which the customization tool controls the CRTC 6 to display the user interface screen on the CRT 10 as described above with reference to FIGS. 3 to 5 so that a user is allowed to customize the printer driver. If the setting is made via the user interface screens such as those shown in FIG. 3 to 5, customization data indicating the setting made is produced. That is, the customization tool writes the data held by this data holding portion to a UPD file (or GPD file) that will be described later. When called, the printer driver determines whether a customized UPD file is present. In a case where the printer driver determines that a customized UPD file is present, the printer driver reads customized print setting data and UI control data contained in the UPD file. Thus, the customization setting of the printer driver is achieved. That is, according to the setting information for customization, the customization tool part functioning as the display control portion calls a UI module of the printer driver. The called UI module causes the CRT display 10 to display a customized UI window, which passes customization information that is set through the UI windows shown in FIGS. 3 to 5, that designates data used to control the display of a control item, and represents the default values of print setting information, by using a pseudo API that will be described later.

The customization data includes various data such as control data indicating whether a control of the user interface of the device driver should be displayed or not, setting data of the device driver such as that shown in FIG. 14, etc.

FIG. 14 shows an example of a data structure of the setting data (DEVMODE).

In the specific example of the setting data shown in FIG. 14, a paper orientation (dmOrientation), a paper size (dmPaperSize), a paper width (dmPaperWidth), the number of copies (dmCopies), etc. are specified. The DEVMODE data structure is stored in a registry. The printer driver 2041 reads a default printing setting or a favorite setting set via the DEVMODE data structure stored in the registry and displays the user interface according to the setting.

The favorite setting set is a set of settings in terms of printing of the printer driver 2041. A user is allowed to achieve a desirable operation environment by specifying the favorite set of printing conditions via the user interface of the printer driver 2041. For example, if a user often uses stamping and stapling, the user may register the set of stapling and stamping as the favorite set of printing conditions. In this case, if the favorite set of printing conditions is selected, these conditions are reflected in the printing operation. Such data is described as customization data, which is part of the property information. The customization data is held by the customization tool and written in a GPD file, which will be described in detail later.

After the customization setting of the printer driver is made via the user interface screens such as those shown in FIGS. 3 to 5, if a customized driver production command is issued (step S607), the customization tool produces a driver customized according to the customization data indicating the customization specified via the user interface screens. Note that the customization data is described in a GPD file accessible by the printer driver. When the printer driver is installed in an operable manner, the printer driver reads the setting data described in the GPD file, and the customized printing conditions specified in the GPD file are reflected in the printer driver. For example, if the setting data indicates that printing should be performed in a double-sided mode and in a 2-in-1 layout, the printer driver is set as such according to the setting data. Thus, it is possible to easily reset the printer driver into default values in terms of printing conditions, customized as desired by a user, simply by installing the customized driver.

Under the control of the CPU 1, the customization tool functions as a generator of the information processing apparatus. More specifically, the generator writes the specified document property or the device property into an information file of the printer driver (device driver) and generates a device driver customized from the original device driver.

That is, the customization tool generates the customized driver by first copying the specified install set into a folder in which the customized driver is to be generated and then writing the customization data into the driver information file (called the UPD file) included in the copied install set.

Figure 9:
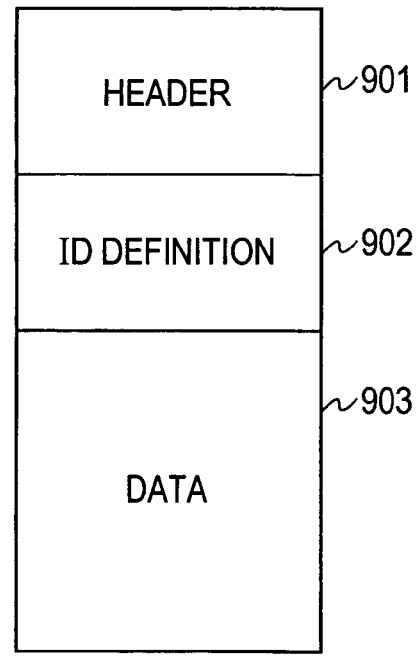
FIG. 9 is a diagram showing a data format of a UPD file of a printer driver.

FIG. 9 illustrates the data format of the driver information file (the UPD file) which is one of the files of the printer driver. As shown in FIG. 9, the UPD file includes a header 901, an ID definition area 902, and a data area 903. In the ID definition area 902, sets of an ID of data stored in the data area 903 and an address of the data are described. Note that as many sets as there are IDs are described in the ID definition area 902. In the present embodiment, the customization tool modifies the data value corresponding to the defined ID for customization. In a case in which the ID definition area 902 includes no ID defined for the customization data to be used, a new ID corresponding to the customization data is added to the ID definition area 902.

Note that there is one UPD file for each device driver (the printer driver) (each device type). Therefore, it is possible to perform customization for each device type. It is also possible to customize a device driver for a certain device by modifying an existing customized driver set for another device. Because the ID described in the ID definition area 902 is specific to a version of customization, it is possible to easily import the settings of an old version of printer driver into a new version.

The customized printer driver is installed by the customization tool by reading the UPD file in which the customization data is described when the printer driver is installed or when the printer driver is started for the first time, and then reading, from the data area 903, the data corresponding to the specified ID described in the ID definition area 902 of the UPD file. Herein, let us assume, by way of example, that in the ID definition area 902 of the UPD file produced by the customization tool, "CUSTOMIZED" is described as an ID, and X is described as the address indicating the location of data corresponding to the ID "CUSTOMIZED".

When the customizable printer driver is installed or started for the first time, if "CUSTOMIZED" is detected as the ID information in the ID definition area 902, the printer driver reads the data at the address corresponding to the ID information. More specifically, in this specific example, when the printer driver is installed or started for the first time, if "CUSTOMIZED" is detected as the ID information in the ID definition area 902, the printer driver reads the data at the address X corresponding to "CUSTOMIZED". The printer driver further reads the device mode data structure, which is a major part of the driver setting data, from the data area 903 at the address X. Note that the address X may be described in an absolute value or an offset address relative to the first address of the data area 903. In the latter case, the absolute value of the first address of the data area 903 is described in the header 901.

Under the control of the CPU 1, the customization tool also functions as a display controller of the information processing apparatus. When the printer driver is started, the customization tool acting as the display controller reads the driver information file of the printer driver and displays a user interface on the CRT 10 according to data described in the driver information file.

In the present embodiment, the customization tool writes into the UPD file, as customization data, initial data (set via the setting boxes 401 to 404 shown in FIG. 4) of the document property defining the default setting of a document, initial data (set via the setting box 405 shown in FIG. 4) of the printer property defining the setting of the device, and data (set via the user interface shown in FIG. 5) indicating a mode in which to control displaying of items associated with the document property in the user interface. When the customized printer driver is installed or started for the first time, the printer driver reads the UPD file produced by the customization tool and operates in accordance with the customization information described in the UPD file. This makes it possible to easily realize the customized printer driver.

The device driver (print driver), which is adapted to control the printer and which is customizable by setting its properties (the initial value data associated with the document property defining the setting of a document and the initial value data associated with the printer property defining the setting of the device), may be installed in an information processing apparatus that may include a determination unit adapted to determine whether the device driver is customizable, a setting unit adapted to display a setting screen (FIGS. 3 to 5) for setting a document property and a device property on the CRT 10 if the determination by the determination unit is that the device driver is customizable, an acquisition unit adapted to acquire data corresponding to the device driver property, and a display control unit adapted to display the data acquired by the acquisition means in the user interface based on the property of the device driver set by the setting means.

Alternatively, the information processing apparatus may include an acquisition unit adapted to acquire one or more properties including a property associated with printing, and a setting unit adapted to set, in a device driver, the one or more properties including the property associated with printing acquired by the acquisition unit without having to register the device driver in an operable manner in an operating system such that the device driver is accessible. In the information processing apparatus, processed by the above-described parts are performed by executing the customization tool under the control of the CPU 1.

Referring again to FIG. 6, after the customized driver is produced (step S608), if an end command is issued by a user (step S609), the operation of the customization tool is ended (step S611).

Figure 8:
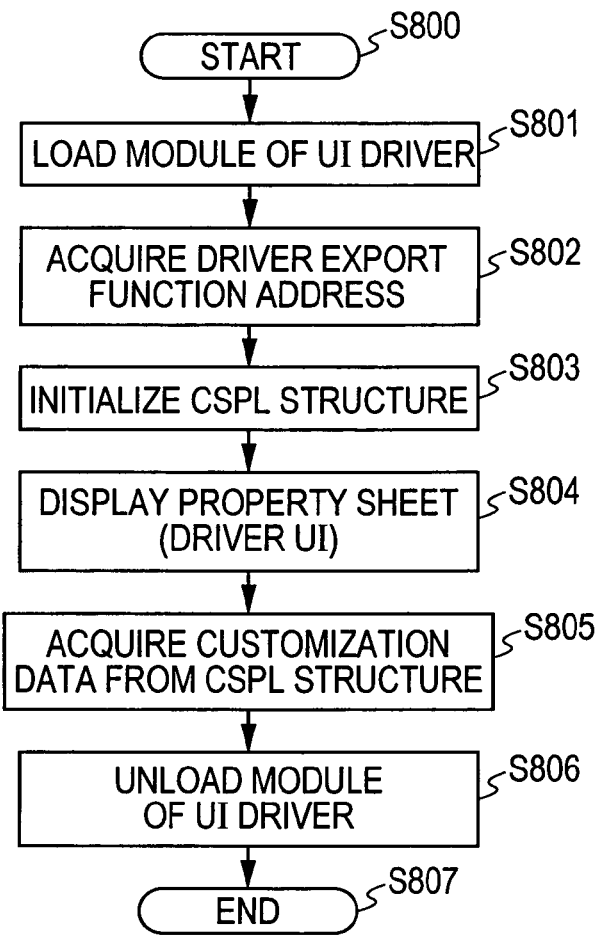
FIG. 8 is a flow chart showing a process of displaying a user interface for customizing a printer driver.

Next, referring to a flow chart shown in FIG. 8, the process performed by the customization tool, under the control of the CPU 1, to display a user interface for customizing the printer driver is described below. Note that this process is performed mainly by the customization tool running on the CPU 1 of the host computer 3000.

If the button 311 shown in FIG. 3 is pressed, the customization tool identifies a module responsible for a user interface process for the printer driver, based on module information included in the inf file. The customization tool then loads the identified module into a memory so that the module can be called by the customization tool (step S801).

Thereafter, in step S802, addresses of functions exported by the module of the printer driver are acquired (step S802), and a CSPL structure (not shown), which is a structure used to transmit information between the customization tool and the customizable printer driver, is initialized (step S803). The CSPL structure includes various kinds of information so that the user interface process associated with the printer driver is allowed even in a state in which the printer driver is not installed.

Thereafter, in step S804, a property sheet (a user interface for defining customization of the driver) is displayed. In this step, a property sheet display function is called to display one of document property pages or a printer property page in the user interface screen. Note that it is possible to display any necessary property page on the same single sheet as shown in FIG. 4.

If the user interface for customization of the driver is closed by a user, information indicating the setting made via the user interface for customization of the driver is described in the CSPL structure, and the customization tool acquires information associated with the corresponding printer driver from the CSPL structure (including a DeviceOption structure and a Devmode structure) (step S805).

Under the control of the CPU 1, the customization tool also functions as an acquisition unit to acquire a document property or a printer driver property corresponding to a device property (a property allowable to be set in a device driver). More specifically, the acquisition unit acquires information associated with the printer driver by transmitting or receiving data from a data storage unit, in which data associated with the setting of the printer driver is described in the form of the CSPL structure and stored. That is, the acquisition unit stores, in the data storage unit, the data (the CSPL structure) corresponding to the document property and/or the device property set via the user interface screen (FIGS. 3 to 5) and the acquisition unit acquires information (the CSPL structure) associated with the printer driver as customization setting information corresponding to the property from the data storage unit. Based on the customization setting information, the customization tool as the display controller displays on the CRT 10 the user interface customized according to the document property and the device property.

The customization setting information is stored such that the setting information associated with the printer property is stored in the DeviceOption structure (not shown) and the setting information associated with the document property is stored in the Devmode structure (not shown), and the customization tool acquires customization setting information from the DeviceOption structure and the Devmode structure.

Thereafter, in step S806, the module loaded in the memory in step S801 is unloaded, and the displaying of the user interface for customization of the driver is ended (in S807).

The process described above is performed in a slightly different way depending on the type of the OS on which the printer driver runs. For example, Windows (registered trademark) NT4.0 and Windows (registered trademark) 2000/XP/Server 2003 use a Common Property Sheet UI to display the driver user interface, and thus, in these OSs, calling of a Common Proper Sheet UI function is performed as preprocessing. On the other hand, in the case of Windows (registered trademark) 98/ME, a Property Sheet function is called in a preprocessing step. In any case, the basic process is performed in the manner described above with reference to the flow chart shown in FIG. 8.

Figures 10A, 10B:
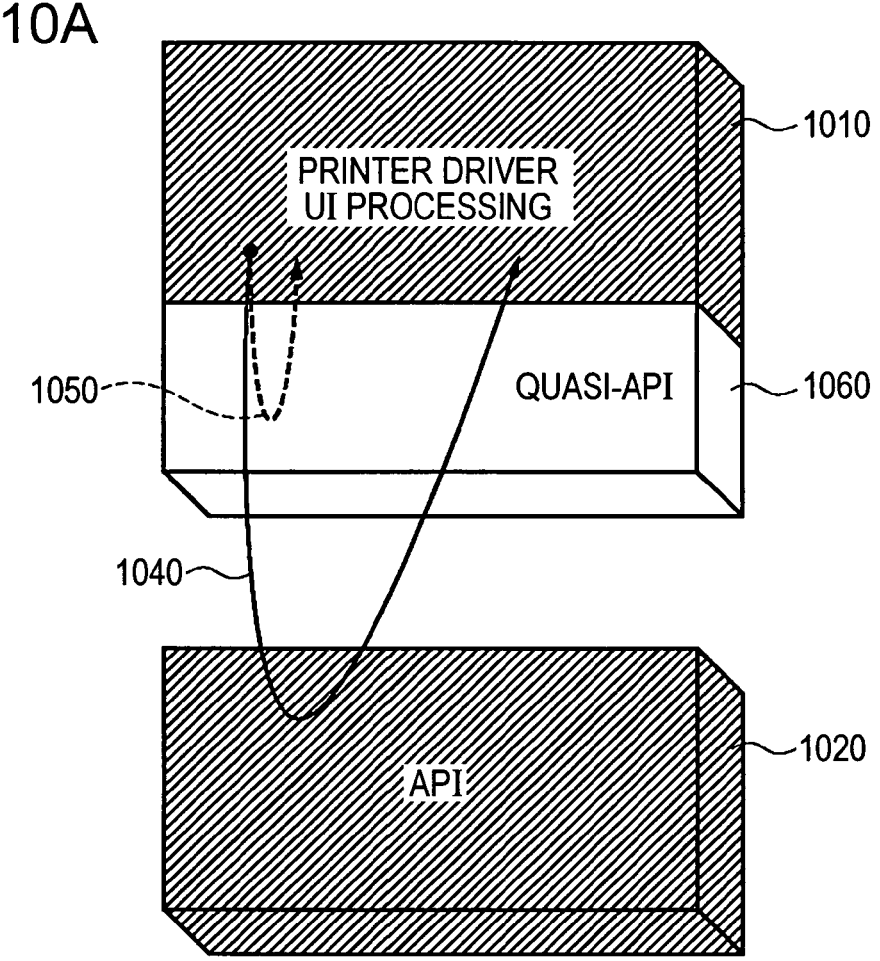
FIG. 10A is a diagram showing a process of calling an application program interface (API) installed in a printer driver.
FIG. 10B is a diagram showing a relationship between an API and a corresponding pseudo-API.

FIG. 10A shows a process of calling a Windows (registered trademark) Application Program Interface (API) installed in a printer driver. In a case in which a printer driver has been installed, a Windows (registered trademark) API (denoted simply as "API" in FIG. 10A) is called (1040) in a normal manner in the user interface process 1010 of the printer driver. However, when a Windows (registered trademark) API is called in a state in which the customizable printer driver has not been installed, a pseudo Windows (registered trademark) API 1060 (denoted simply as "pseudo API" in FIG. 10A) corresponding to the called Windows (registered trademark) API responds to the call and simulates the process that would be performed by the called Windows (registered trademark) API. The result is returned to the printer driver user interface process 1010.

In FIG. 10B, a table 1030 shows the correspondence between Windows (registered trademark) APIs (denoted simply as "API" in FIG. 10B) and pseudo Windows (registered trademark) APIs (denoted as simply as "pseudo API" in FIG. 10B). This correspondence may be described in advance in the installed printer driver. Normally, a program controlling the user interface for the printer driver is adapted to call the Windows (registered trademark) API according to data inputted to the printer driver. The present embodiment is configured so that the pseudo API can be called although the Windows (registered trademark) API cannot be called in a state in which the printer driver is not installed.

When a pseudo Windows (registered trademark) API is called from the customization tool, the pseudo Windows (registered trademark) API simulates the process that would be performed by a corresponding Windows (registered trademark) API and returns a result to the printer driver user interface process 1010. On the other hand, when an API is called in a normal state in which the printer driver has been installed in the OS, a Windows (registered trademark) API 1020 responds to the call and returns a result to the printer driver user interface process 1010.

Figure 11:
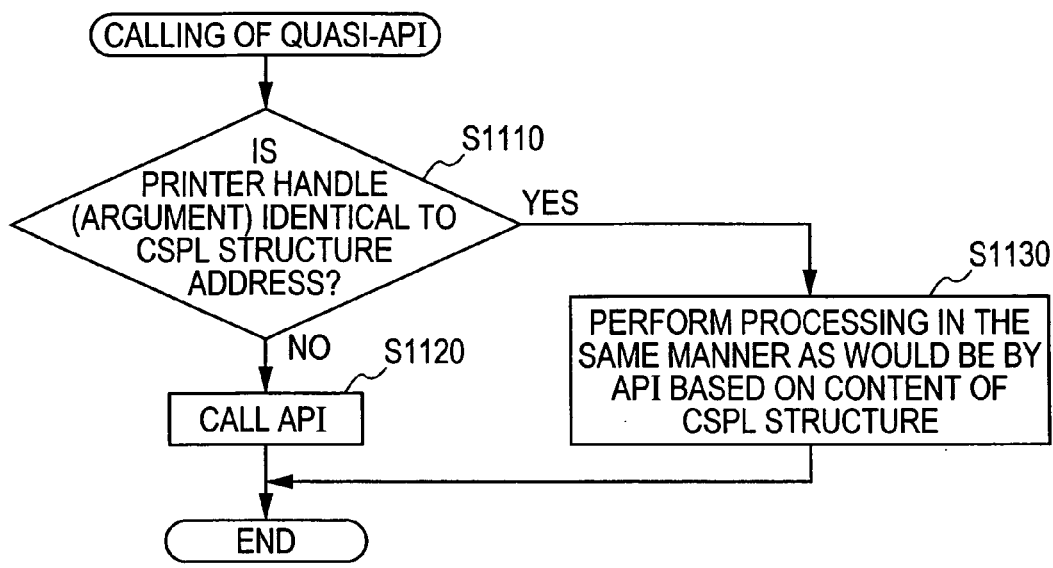
FIG. 11 is a flow chart showing a process of calling a pseudo Windows (registered trademark) API.

FIG. 11 is a flow chart showing the process of calling a pseudo Window (registered trademark) API (denoted simply as "pseudo API" in FIG. 11). Note that this process is performed mainly by the customization tool running on the CPU 1 of the host computer 3000. First, in step S1110, the customization tool determines whether a printer handle (argument) included in arguments of the Windows (registered trademark) API is identical to address information of the CSPL structure which is transferred in response to a call from the customization tool (hereinafter, such address information will be referred to simply as "address information"). The first member of the CSPL structure indicates the size of the CSPL structure. Therefore, if the given printer handle (argument) is equal to the size of the CSPL structure, the printer handle given as the argument can be regarded as the address of the CSPL structure (that is, the answer to step S1110 is Yes). The UI module of the printer driver stores data representing processing results, for example, data representing the values of print setting items and the designation of the display of controls, which are inputted through the UI, in the structure designated by the handle. Then, the process is finished.

If the printer handle given as the argument is not identical to the address of the CSPL structure (that is, if the answer to S1110 is No), it is determined that the call is made in a normal operation of the printer driver, and a corresponding Windows (registered trademark) API (denoted simply as "API" in FIG. 11) (step S1120). After step S1120, the process is ended.

In the case in which the determination in step S1110 is that the printer handle given as the argument is identical to the address of the CSPL structure (that is, if the answer to S1110 is Yes), the process proceeds to step S1130, in which the customization tool calls the Windows (registered trademark) API in the state in which the printer driver is not installed. Actually, in the state in which the printer driver is not installed, the Windows (registered trademark) API cannot be called, and thus a pseudo Windows API performs processing in the same manner as would be performed by the Windows API (step S1130) and a result is returned to the printer driver user interface process 1010. After step S1130, the process is ended.

In the above-described process, under the control of the CPU 1, the customization tool functions as a selection unit of the information processing apparatus. More specifically, the selection unit selects an application program interface (Windows API or a pseudo Windows API) to be used (called) based on the address information (the first address) stored in the data storage unit (CSPL structure).

Figure 12:
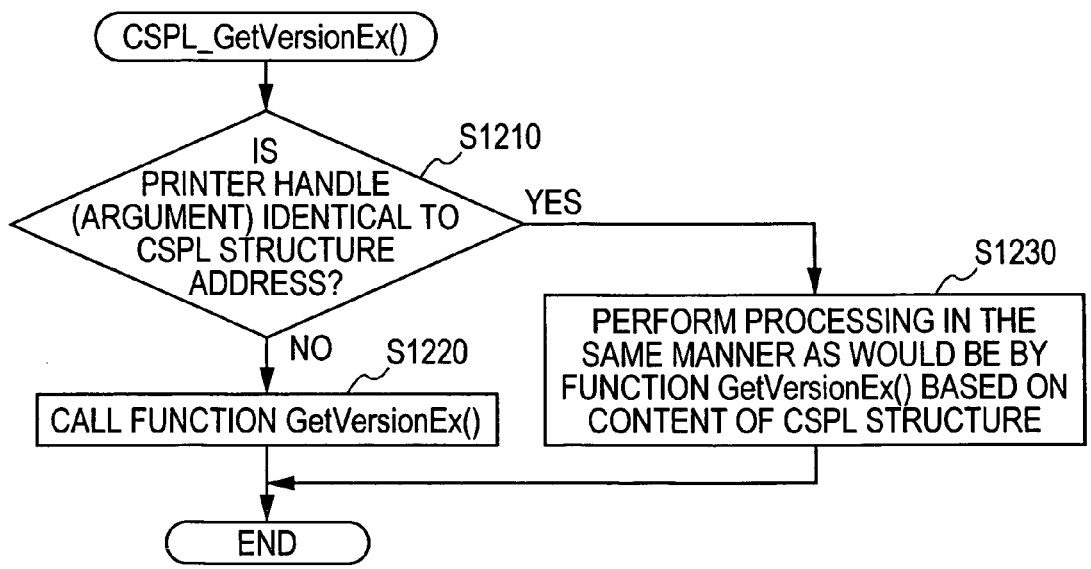
FIG. 12 is a flow chart showing a process of calling CSPL_GetversionEx( ), which is a specific example of a pseudo Windows (registered trademark) API function.

FIG. 12 is a flow chart showing a specific example of a process of a pseudo Windows (registered trademark) API. In this specific example, a function CSPL_GetVersionEx( ) is called from the printer driver as a pseudo Window (registered trademark) API. Note that this process is performed mainly by the customization tool running on the CPU 1 of the host computer 3000. In this specific case, the function CSPL_GetversionEx( ) simulates the Windows (registered trademark) function GetVersionEx( ) (see a table 1030 in FIG. 10B), which is a function of returning information indicating the version of the OS running on the host computer to the process 1010 of the printer driver user interface. Also, the CSPL_GetVersionEx function is called by the customization tool function.

First, in step S1210, the CSPL_GetVersionEx function in the customization tool determines whether the printer handle given as an argument of the function is identical to the address of the CSPL structure which was transferred when the function was called. If the printer handle is not identical to the address of the CSPL structure (that is, if the answer to S1210 is No), the process proceeds to step S1220, in which the customization tool calls Windows (registered trademark) API function GetVersionEx( ) 1040 of the printer driver in a normal manner (step S1220). This determination method is similar to that described in the description of the step S1110 shown in FIG. 11. After step S1220, the process is ended.

On the other hand if the determination in step S1210 is that the printer handle is identical to the address of the CSPL structure (that is, if the answer to S1210 is Yes), the process proceeds to step S1230, in which the process of function GetVersionEx( ) is virtually performed based on the information, stored in the CSPL structure, associated with the OS corresponding to the printer driver (the process is performed in the same manner as would be performed by function GetVersionEx( )) (step S1230).

When an application program interface (a pseudo Windows (registered trademark) API) corresponding to a document property or a device property set via the user interface screen (FIGS. 3 to 5) is called, the process of the printer driver corresponding to the document property or the device property is virtually performed (the process is performed in the same manner as would be performed by the corresponding Windows (registered trademark) API).

If the process in step S1230 or S1220 is completed, the process of the flow chart shown in FIG. 12 is ended.

The CSPL_GetVersionEx function returns processing results, which are the same as those obtained by the GetVersionEx function, to the printer driver UI module in step S1230. The same goes for other functions. For example, when the customization tool is running on Windows (registered trademark) 2000/XP/Server 2003, if a function to perform a user interface process of a driver module of a different OS such as Windows (registered trademark) 98/ME is called from the customization tool, the CSPL structure having information indicating the OS version is examined and OS version information indicating that the OS is "Windows (registered trademark) 98/ME" is returned whereby it is possible to control the process of the user interface of the driver module of the Windows (registered trademark) 98/ME without having any problem.

That is, objects to be customized are printer drivers of the Windows (registered trademark) 98/ME and driver information provided by, for example, INF files and driver user interface modules. In the present embodiment, the customization tool is supported by Windows (registered trademark) 2000/XP/Server 2003. It is assumed that the environment, in which the customization tool is executed, is controlled by one of these OSs. The CSPL structure is initialized in step-S803 shown in FIG. 8. At that time, information, which indicates, for example, that the OS supporting the driver module is Windows (registered trademark) 98/ME is written to the CSPL structure as OS version information representing the version of the OS. Consequently, the CSPL structure contains the information (that is, the OS version information) indicating that the OS supporting the driver module is Windows (registered trademark) 98/ME. Thus, the CSPL_GetVersionEx function accesses the OS version information contained in the CSPL structure and returns a value, which represents "Windows (registered trademark) ME", to the calling printer driver UI module. When any other pseudo Windows (registered trademark) function is called, the call is handled in a similar manner. Thus, when a Windows (registered trademark) API function is called in a state in which the printer driver is not installed, a corresponding pseudo Windows (registered trademark) API function is executed to simulate the called Windows (registered trademark) API function whereby the operation of the Windows (registered trademark) is virtually reflected in the user interface operation without creating a problem that would otherwise occur.

Although not described explicitly above, the printer driver of Windows (registered trademark) 98/ME is a module designed to be operated in a 16-bit environment. Therefore, a user interface process thereof is also executed in the 16-bit environment. However, in the present embodiment, the user interface process of the printer driver of Windows (registered trademark) 98/ME is executed in a 32-bit environment using a 16 bit to 32 bit conversion mechanism called a sink-up conversion. That is, in the present embodiment, the customization tool calls a user interface function in the 32-bit environment to display and control the user interface of Windows (registered trademark) 98/ME.

More specifically, the customization tool acquires properties including the printer property and sets the properties in the device driver so that the resultant device driver can be read. Note that the setting of the properties is made without registering the device driver in the operating system so that the device driver becomes operable. That is, when the setting of the properties is made, the device driver is stored in a user area of a file system managed by the operating system. Note that the registering of the device driver so that the device driver becomes operable is accomplished by installing the device driver by registering it in a registry area managed by the operating system by an administrator of the operating system so that the operating system can recognize the device driver. The properties are stored in the UPD file by the customization tool. The created UPD file constitutes the installation set, together with the printer drivers, the printer driver UI modules, and the INF files to be customized. The created installation set is distributed to each of client computers through recording media and communication media. An installer performs installation according to information described in the INF file. The installer copies a value corresponding to each setting item read from the UPD file as the value of a corresponding item of each of the devmode structure and the deviceOption structure. The printer driver and the printer driver UI module operate by referring to the value of each of items stored in the devmode structure and the deviceOption structure.

The process described above is performed by the customization tool that is one of application programs. When the customization tool receives information via the device driver, the customization tool responds, as a surrogate for the operating system, to the device driver.

The device driver regards the surrogate response from the customization tool as received from the operating system and the device driver continues the following setting process in accordance with a command or data input by a user.

Note that the customization tool is realized by the pseudo API for the printer driver. The customization tool is capable of setting properties including a printing property for a plurality of device drivers for use with different types of operating systems (such as Windows (registered trademark) NT, Windows (registered trademark) 95, etc.)

The customization tool can set information associated with printing acquired by the customization tool for a plurality of device drivers at a time.

As described above, the pseudo API according to the present embodiment allows the customization tool to respond, as a surrogate for the operating system, to the device driver so that the device driver receives a response equivalent to that given by the operation system in a state in which the device driver is actually installed operably in the operating system. If the customization tool does not respond to the device driver in the above-described manner, the device driver will perform an error handling process. Thus, as described above, the customization tool according to the present embodiment has the capability of performing the customization process without having to install the device driver.

FIG. 13 is a flow chart showing a process of controlling a user interface for setting a property of a printer driver for customization. Note that this process is performed mainly by the customization tool running on the CPU 1 of the host computer 3000. In a procedure shown in FIG. 13, the pseudo API functions illustrated in FIGS. 11 and 12 are called. Thus, the display of property sheets, the acquisition of parameters, and the input of set values are realized.

First, in step S1300, if a user interface control command is issued, the customization tool is started. In step S1310, the user interface is initialized. In step S1320, if it is determined that customization information associated with displaying of the user interface is described in the driver information file shown in FIG. 9 (that is, if the answer to S1320 is Yes), the process proceeds to step S1330, in which the customization information is reflected in the displaying of the user interface (for example, items are enabled, disabled or hidden in accordance with the customization information). The process then goes into a waiting state to wait for an operation to be performed by a user (step S1340). On the other hand, if there is no customization information (that is, if the answer to S1320 is No), step S1330 is skipped and the process goes into a waiting state (step S1340).

If an operation is performed by a user (step S1340), a determination is performed as to whether a user interface close command has been issued (step S1350). If the answer to step S1305 is Yes, the user interface process is ended (step S1370). If the answer to step S1305 is No, the user interface is controlled in accordance with a command/data given by the user (step S1360). After step S1360, the process returns to step S1320. The property information inputted through the UI is stored again in the printer driver information file (that is, the UPD file) through the CSPL structure. At that time, the customization code (Z) illustrated in FIG. 3 is stored in the printer driver information file, together with a preliminarily identification code.

For example, when customization data indicating the manner in which to control the displaying of the user interface (specified via the screen shown in FIG. 5) is described in the driver information file such as that shown in FIG. 9, displaying of the user interface is controlled in accordance with the customization data.

Although in the present embodiment, the customization information is written in the driver information file called the UPD file, it is not necessarily needed to write the customization information in the UPD file. The customization information may be written in another type of file, as long as the file is readable and interpretable by the printer driver. In a next version of Windows (registered trademark) system called Longhorn, a GPD file will be used as a driver information file for a printer driver. It will be allowed to describe customization information in the GPD file.

According to the present embodiment, an install set of a customized driver can be produced as desired by a user in a state in which the device (printer) driver is not installed. The unnecessity of installing a device (printer) driver designed to operate on a specific OS makes it possible to customize the device (printer) driver in a highly efficient manner.

Thus, even when an OS does not allow customization for an original printer driver, it is possible to produce a customized driver as desired by user.

The customization of the default values of a printer driver is performed via a user interface similar to an original user interface dedicated to the printer driver. This allows the customization of the default values to be made easily. By enabling or disabling displaying of items or by hiding items according to the setting made via the user interface in the above-described manner, it is possible to provide better operability and higher convenience to a user.

Because an install set of a customized driver is similar in structure to that of an original uncustomized driver, it is possible to run the customized driver in various kinds of operating systems such as a Microsoft Windows (registered trademark) operating system, or in a point and print environment in the next-version of Windows called Longhorn. That is, it is possible to provide a customized driver that can run in a wide variety of operating system.

Other Embodiments

Note that the present invention can also be implemented by providing, to a system or an apparatus, a storage medium having software program code stored thereon and reading and executing the program code on a computer (or a CPU or a MPU) disposed in the system or the apparatus thereby implementing the functions disclosed in the embodiments described above.

In this case, the program code read from the storage medium implements the functions disclosed in the embodiments described above, and the storage medium on which the program code is stored falls within the scope of the present invention. The functions disclosed in the embodiments may be implemented not only by executing the program code on a computer, but part or all of the process may be performed by an operating system (OS) or the like running on the computer in accordance with a command issued by the program code. Such implementation of the functions also falls within the scope of the present invention.

The program code stored on the storage medium may be loaded into a memory of an extension card inserted in a computer or into a memory of an extension unit connected to a computer, and part or all of the process may be performed by a CPU disposed on the extension card or the extension unit in accordance with the loaded program code. Such implementation of the functions also falls within the scope of the present invention.

To implement the present invention on such a storage medium, program code corresponding to a flow chart (shown in FIG. 6 or 8 or one of FIGS. 11 to 13) is stored on the storage medium.

While the present invention has been described with reference to exemplary embodiments, it is to be understood that the invention is not limited to the disclosed exemplary embodiments. In particular, although the invention has been described with reference to printer drivers, drivers for other devices such as for example audio or video or imaging or scanning devices can benefit from the present invention. The scope of the following claims is to be accorded the broadest interpretation so as to encompass all modifications, equivalent structures and functions.

This application claims the benefit of Japanese Application No. 2005-095694 filed Mar. 29, 2005, which is hereby incorporated by reference herein in its entirety.

What is claimed is:

1. An information processing apparatus comprising:
   a driver customization unit configured to customize a device driver by operating before installation of the device driver in an operable manner to an operating system, the driver customization unit comprising:
      an acquisition unit for acquiring one or more properties including a property associated with printing by getting a response from a call of a pseudo application program interface of the device driver, wherein the pseudo application program interface determines whether the pseudo application program interface is called from the customization unit and calls an application program interface of the operating system if the pseudo application program interface is called from a unit other than the customization unit and simulates the application program interface of the operating system without calling the application program interface of the operating system if the pseudo application program interface is called from the customization unit; and
      a setting unit for setting, in the device driver, the one or more properties including the property associated with printing acquired by the acquisition unit without registering the device driver in the operable manner in the operating system.

2. The information processing apparatus according to claim 1, further comprising a response unit for, as a surrogate for the operating system, responding to the device driver when information is input to the information processing apparatus via the device driver.

3. The information processing apparatus according to claim 2, wherein the device driver regards the response from the response unit as a response from the operating system and, after the response is received, the device driver continues a following process.

4. The information processing apparatus according to claim 3, wherein the pseudo application program interface corresponds to a printer driver and the response unit is implemented by the pseudo application program interface.

5. An information processing apparatus according to claim 4, wherein the customization unit sets one or more properties for a plurality of device drivers designed to be executed on different types of operating system.

6. The information processing apparatus according to claim 5, wherein the customization unit customizes a plurality of device drivers at the same time.

7. An information processing apparatus according to claim 1, wherein the pseudo application program determines based on an argument, whether the pseudo application program is called from the device driver or the acquisition unit.

8. An information processing method comprising:
customizing a device driver using a driver customization unit operating before installation of the device driver in an operable manner to an operating system, wherein the driver customization unit acquires one or more properties including a property associated with printing by getting a response from a call of a pseudo application program interface of the device driver, wherein the pseudo application program interface determines whether the pseudo application program interface is called from the customization unit and calls an application program interface of the operating system if the pseudo application program interface is called from a unit other than the customization unit and simulates the application program interface of the operating system without calling the application program interface of the operating system if the pseudo application program interface is called from the customization unit and sets, in the device driver, the one or more properties including the acquired property associated with printing without registering the device driver in the operable manner in the operating system.

9. The information processing method according to claim 8, further comprising responding, as a surrogate for the operating system, to the device driver when information is input to the information processing apparatus via the device driver.

10. The information processing method according to claim 9, wherein the device driver regards a response from the responding as a response from the operating system and, after responding to the device driver, the device driver continues a following process.

11. The information processing method according to claim 10, wherein the pseudo application program interface corresponds to a printer driver and the responding is implemented by the pseudo application program interface.

12. An information processing method according to claim 11, wherein the customization unit sets one or more properties for a plurality of device drivers designed to be executed on different types of operating system.

13. The information processing method according to claim 12, wherein the customization unit customizes a plurality of device drivers at the same time.

14. An information processing method according to claim 8, wherein the pseudo application program determines based on an argument, whether the pseudo application program is called from the device driver or the acquisition unit.

15. A computer-readable medium having computer-executable instructions stored thereon, which when executed by a computer of an information processing apparatus cause the information processing apparatus to execute a process comprising:
customizing a device driver using a driver customization unit operating before installation of the device driver in an operable manner to an operating system, wherein the driver customization unit acquires one or more properties including a property associated with printing by getting a response from a call of a pseudo application program interface of the driver, wherein the pseudo application program interface determines whether the pseudo application program interface is called from the customization unit and calls an application program interface of the operating system if the pseudo application program interface is called from a unit other than the customization unit and simulates the application program interface of the operating system without calling the application program interface of the operating system if the pseudo application program interface is called from the customization unit and sets, in the device driver, the one or more properties including the acquired property associated with printing without registering the device driver in the operable manner in the operating system.

* * * * *